United States Patent
Cohen et al.

(10) Patent No.: US 6,464,135 B1
(45) Date of Patent: Oct. 15, 2002

(54) METHOD AND SYSTEM FOR ASSISTING THE VISUALLY IMPAIRED IN PERFORMING FINANCIAL TRANSACTIONS

(75) Inventors: Albert E. Cohen, Los Angeles; Michael L. Grandcolas, Santa Monica; Stephen M. Gryte; Teresa A. Petach, both of Los Angeles; Michael L. Sears, Torrance, all of CA (US)

(73) Assignee: Citicorp Development Center, Inc., Los Angeles, CA (US)

( * ) Notice: Subject to any disclaimer, the term of this patent is extended or adjusted under 35 U.S.C. 154(b) by 83 days.

(21) Appl. No.: 09/607,919

(22) Filed: Jun. 30, 2000

Related U.S. Application Data

(60) Provisional application No. 60/141,288, filed on Jun. 30, 1999.

(51) Int. Cl.[7] .............................................. G06K 17/60
(52) U.S. Cl. ........................ 235/379; 235/380; 235/382
(58) Field of Search ................................. 235/379, 380, 235/382, 375; 705/43

(56) References Cited

U.S. PATENT DOCUMENTS

| | | | | |
|---|---|---|---|---|
| 5,239,583 A | * | 8/1993 | Parrillo | 705/72 |
| 5,354,974 A | * | 10/1994 | Eisenberg | 235/379 |
| 5,589,855 A | * | 12/1996 | Blumstein et al. | 345/173 |
| 5,610,382 A | * | 3/1997 | Yamamoto | 235/379 |
| 5,962,830 A | * | 10/1999 | Wallace | 235/379 |
| 6,061,666 A | * | 5/2000 | Do et al. | 705/43 |
| 6,327,575 B1 | * | 12/2001 | Katz | 705/16 |

* cited by examiner

Primary Examiner—Michael G. Lee
Assistant Examiner—Ahshik Kim
(74) Attorney, Agent, or Firm—Kilpatrick Stockton LLP; George T. Marcou

(57) ABSTRACT

The present invention pertains to a system and method for assisting a visually impaired individual in performing a financial transaction at an automated teller machine, comprising initiating a visually impaired transaction session through a preset event at the automated teller machine; wherein the automated teller machine comprises a touch screen display for displaying operation instructions to a customer and for receiving input from a customer; an output jack for providing signals which can be converted to audible sounds by means of a headset; a bill dispensing mechanism for dispensing a bank not corresponding to a specified amount; a receipt issuing unit for printing a transaction content and for issuing a receipt on which the transaction content is printed; and a controller connected to the card reader, the touch screen display, the output jack, the bill dispensing unit, and the receipt issuing unit, the controller providing signals to the output jack corresponding to information provided on the touch screen display; providing instructions to the visually impaired individual for performing the financial transaction through the output jack which provides signals which can be converted to audible sounds by means of a headset; and receiving input from the visually impaired individual through the touch screen display.

10 Claims, 4 Drawing Sheets

METHOD AND SYSTEM FOR ASSISTING THE VISUALLY IMPAIRED IN PERFORMING FINANCIAL TRANSACTIONS

CONTINUING DATA

This application claims priority to U.S. Provisional Application No. 60/141,288 filed on Jun. 30, 1999, which is incorporated herein by reference.

BACKGROUND OF THE INVENTION

1. Field of the Invention

The present invention relates generally to delivery of multi-function financial services and more particularly to an improved system and method for providing multi-function financial services to a visually impaired user through an ATM or a CAT.

2. Description of Related Art

Federal law, including the Americans with Disabilities Act (ADA), have resulted in growing emphasis in providing services to disabled individuals. Often times, this increased emphasis provides modifications to modern devices of convenience such that disabled individuals are able to enjoy the benefits of such devices.

One of the modern devices of convenience is the automated teller machine (ATM) or customer access terminal (CAT), which allows individuals to conduct financial transactions at any time without having to visit a bank. Such devices are widely used by the general population.

However, ATMs and CATs have not proven themselves useful to visual impaired people (VIP) because one of the primary means of communication using such devices is through screen displays which provide information from the financial institution and solicit information from the customer of the financial institution.

To assist visually impaired individuals, a variety of approaches have been developed that assist such disabled people to use an ATM or CAT.

For example, WO 98/27533 to Citicorp Development Center discloses an ATM using a combination of a touch screen and audio instructions in order to facilitate use of the machine by a blind customer. In addition, JP 62-186359 describes an ATM comprising a touch panel with four switches that when activated, in various combinations, represents transaction information. U.S. Pat. No. 4,593,183 to Fukatsu discloses an ATM comprising a voice output unit which provides an operation guide, in combination with a display, for customers. U.S. Pat. No. 4,761,542 to Kubo et al. discloses an ATM with a visual guidance display and an aural guidance unit which provide verification to a visually handicapped user that transactions are completed properly. U.S. Pat. No. 5,185,515 to Nishibe discloses an ATM comprising a touch screen guidance panel and audio guidance. U.S. Pat. No. 5,412,189 to Cragun discloses an ATM which facilitates use by a visually impaired user by incorporating a touch screen display with tactile markings and aural feedback while browsing through various transaction screens on the display. U.S. Pat. No. 5,589,855 to Blumstein et al. discloses an ATM with a touch screen. A visually impaired user is directed either with Braille or audible cues to perform a sequence of steps, including contact with the touch screen, to execute a transaction. U.S. Pat. No. 5,895,903 to Abe et al. discloses an electronic wallet or terminal for a portable financial IC card. Visually impaired users and seeing users benefit from visual guidance on a display or audio guidance through an earphone or small speaker.

While these approaches have provided additional assistance to visually impaired individuals, the conventional approaches have not addressed the confidential and sensitive nature that can be present during a financial transaction by means of an ATM or a CAT. Nor do these conventional approaches offer a convenient way for a visually impaired individual to input his/her personal identification number (PIN).

Accordingly, there remains a need for a convenient way for a visually impaired individual to conduct a financial transaction at an ATM or CAT, while maintaining the confidential aspects of the information. In addition, there remains a need for a convenient way for a visually impaired individual to conduct a financial transaction at an ATM or CAT, in which the individual's PIN can be conveniently inputted.

BRIEF SUMMARY OF THE INVENTION

It is a feature and advantage of the present invention to provide an improved system and method for providing multi-function financial services to a user through an ATM or a CAT.

It is a further feature and advantage of the present invention to provide a system and method for providing multi-function financial services to a user through an ATM or a CAT with an improved account information user interface, which supports visually impaired users.

It is another feature and advantage of the present invention to provide a system and method for providing multi-function financial services to a user through an ATM or a CAT with improved transfers functionality, which supports visually impaired users.

It is a still further feature and advantage of the present invention to provide a system and method for providing multi-function financial services to a user through an ATM or a CAT with improved cash deposit functionality, which supports visually impaired users.

To achieve the stated and other features, advantages and objects, an embodiment of the present invention provides an improved system and method for providing multi-function financial services to a user through an ATM or a CAT, which supports visually-impaired users and adds functionality related, for example, to account information, bill payment, transfers, cash deposits, and cash withdrawals.

Additional objects, advantages and novel features of the invention will be set forth in part in the description which follows, and in part will become more apparent to those skilled in the art upon examination of the following, or may be learned by practice of the invention.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE INVENTION

Improved banking for the visually impaired can be a significant source of new customers for a financial institution, such as a bank. The visually impaired require an improved system and method to conduct ATM or CAT banking.

The invention provides a touchscreen navigation method and text-to-speech capability for the visually-impaired person using an ATM or CAT, thus, providing independence to the visually impaired customer. Using a headset, the visually impaired customer will be able to hear and select any of the transaction choices available to the sighted customer. The customer will not have to memorize transaction sequences. If functionality is changed in the future, the visually impaired customer will be able to invoke new features without learning a new transaction sequence. Furthermore, the invention provides VIP Functionality; VIP Navigation; the Initial Screen Flow for VIP Customers; VIP PIN Entry; and the Screen Reader.

The touchscreen navigation method and text-to-speech capability of the VIP application provides independence to the visually impaired customer. Using a headset, the visually impaired customer will be able to hear and select any of the transaction choices available to the sighted customer. The customer will not have to memorize transaction sequences.

All of the screens displayed for the visually impaired customer are different in presentation from the screens for a sighted customer, because of the ADA requirement for minimum font size and color contrast for viewing by partially sighted customers and because of the font size and color contrast conventionally employed. However, the information and transaction choices available are identical.

In order to use the VIP feature, the customer must bring a headset to the ATM and plug it into the jack below the card reader on the front panel. Visually impaired customers will require some training before using the VIP application, primarily for familiarizing themselves with the touchscreen navigation.

The VIP functionality of the present invention allows visually impaired customers to have access to the equivalent range of transactions that sighted customers have. This capability is accomplished by providing voicing of the screen contents so that the VIP customer, using a headset, can hear all the choices and information that the sighted customer sees.

Unique problems are presented when the ATM or CAT uses a touchscreen only, with no keypad or function keys. This problem is solved by the present invention having a constant set of navigation zones on the bottom of all screens. Using the three touch zone functions NEXT, PREVIOUS, and SELECT, the visually impaired customer can "step" through the screen at his or her own speed, hear each choice, and select the desired action.

Figure 1:
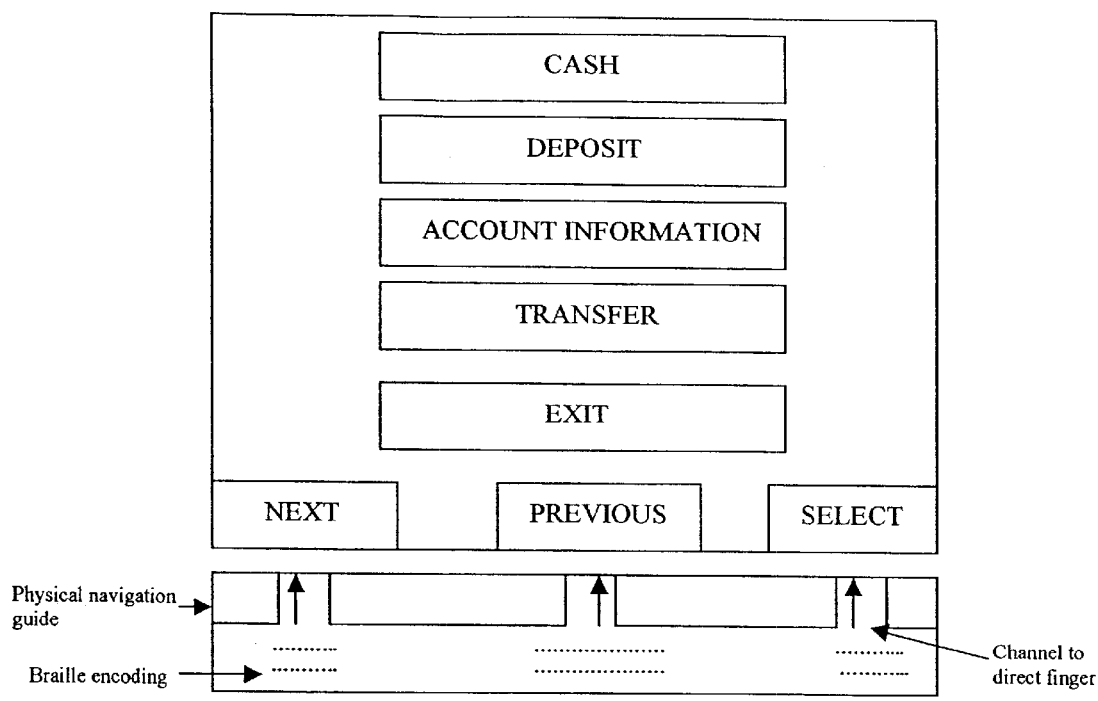
FIG. 1 presents a simplified transaction screen illustrating the navigation methodology of the present invention.

All of the information on the screen is separated into sections that can be sequenced through one at a time by touching NEXT. There will be a physical guide bar (with Braille encoding) below the touchscreen to position the customer's finger to one of the three navigation zones. Above the navigation zones will be the transaction choices and information. Touching above the navigation zones will produce a boop-like sound, indicating an invalid selection. The customer must use the navigation zones at the bottom of the screen to navigate and select choices. This arrangement is depicted in FIG. 1.

In a preferred embodiment of the present invention, the customer starts the VIP application by touching twice in the top right-hand corner of the touchscreen. Each tap will generate a beep sound.

PIN entry in VIP presents some special issues. In order to maintain an appropriate level of security, the customer taps in the PIN digits rather than hear the digits voiced.

An appropriate screen reader program is incorporated into the infrastructure. The screen reader is the component that converts text on the screen to speech, which will be audible to the customer through the headset. The screen reader will be started up at system initialization, but will remain mute until the application detects that a VIP session has been initiated. At this point, voicing will be enabled and will continue until the VIP session has terminated (either naturally or via timeout or error). The voicing will then be muted until the next VIP transaction.

When voicing is enabled, it will be heard through the speaker if the headset is not plugged in. Also, if the headset is pulled out, voicing will be disabled. In a preferred embodiment of the present invention, there is detection of headset insertion.

The present invention also provides improvements, enhancements and additions, which support visually impaired users utilizing, for example, text reader software, such as DECtalk Express, external, with JAWS for Windows, Version 3.0/3.2.

Furthermore, for those individuals who are not blind, but partially sighted, ATM and CAT features, such as, large fonts and high contrast are provided in an embodiment of the invention. The normal sighted customer will access the ATM or CAT in the normal mode, and those with disabilities will access the ATM or CAT using the VIP (Visually Impaired Persons) or ADA (American Disabilities Act) modes that would facilitate the transaction, through, for example, voice and special navigation.

In one preferred embodiment of the present invention, there are three types of text boxes or buttons that can be selected by the customer.

The first type of selectable text boxes or buttons is text read by the screen reader, but not resulting in an action. An example of this is the screen description text box. "Shall I go ahead?" is another example of such text. Some of this text may be hidden. These text boxes are in the Work Area of the screen.

The second type of selectable text boxes or buttons is text read by the screen reader that results in some kind of action, such as a screen transition. The first contains text that is read by the screen reader but results in no action. Yes and No are examples of this type of text. Other examples include Back to Prior Screen and Exit. These are all in the screen Work Area.

The third type of selectable text boxes or buttons is the navigation button or buttons. The customer actually touches these buttons that are in the Navigation Zone at the bottom of the screen. They are used to select text boxes in the work area of the screen, as well as to transition to the next screen.

In a VIP session, the screen layout consists of three parts, Context Zone, Work Area, and Navigation Zone.

Within the first zone, Context Zone, the context is displayed at the top of each screen. The context should reflect the application the customer is currently using (i.e. Welcome, Account Information, Main Menu, Deposit). The context text is left justified with white font against a gray background. The first letter of each word is capitalized. The text is of a standard font and size. The context graphic stretches the length of the zone.

The second zone, the Work Area, contains the menus, information and forms for the applications and is displayed in accordance with the following guidelines:

Each selectable block of text or button is contained in a separate box. This box is displayed with white font against a gray background.

The boxes are highlighted and selected using the controls contained in the navigational zone. Boxes are selected from left to right and from top to bottom, beginning with the upper left box with the exception of Amount Selection screens. The screen reader reads the currently selected text.

As the customer navigates in the Work Area, the boxes are highlighted in a defined order. The screen reader reads the highlighted box text from left to right and from top to bottom. When the box is highlighted, the background is changed from gray to black. The selectable boxes are contained within standard left and right margins. The text within boxes is always left justified within the box unless otherwise specified. Some screens include hidden text that is not visible but is read to the customer by the screen reader.

The third zone, the Navigation Zone, provides the primary controls for the VIP customer. The Navigation Zone consists of three buttons:

1. NEXT. Highlights the next logical item within the Work Area. If nothing has yet been highlighted on the screen, the first selectable item is highlighted.
2. PREVIOUS. Highlights the previous item within the Work Area. If nothing has yet been highlighted on the screen, then the last selectable item is highlighted.
3. SELECT. Selects the highlighted item and transitions to the next appropriate screen (except for PIN entry and amount entry). A beep should sound to confirm a correct selection and a boop to indicate an invalid selection.

These buttons are displayed on every screen with the exception of PIN entry screens. The customer can touch these buttons and navigate in a defined order through the selectable items in the Work Area. The button text is formatted in all capital letters and centered with white font against a gray background. The buttons are all of a standard size.

In another preferred embodiment of the present invention, the VIP screen reader provides for a screen timeout after a specified period of time. In one particular embodiment of the present invention, the timeout value for all screens is 45 seconds (except for PIN entry and amount entry). The timer is reset each time the customer takes an action. For example, if the customer waits 40 seconds to make a selection, the timer is reset to 45 seconds after the selection has been made.

The Welcome screen is a special case and has a longer timeout value. In one embodiment, the Welcome screen has a timeout period of 75 seconds.

As will be appreciated there will be a series of screens for assisting a visually impaired person in conducting a financial transaction. These screens include PIN Entry Screens, Menu Screens, Account Selection Screens, Amount Selection Screens, Amount Entry Screens, Confirmation Screens, Summary Screens, Disclosure Screens, and Print Record Confirmation Screens, and Error Screens.

Every screen within the VIP application set will voice the string "New Screen" upon the presentation of a new screen to the visually impaired customer, indicating that the customer has transitioned to a new screen. The screen reader will read this text prior to any customer input on the screen. Following this brief screen introduction, the customer transitions through the items using the navigational controls: NEXT, PREVIOUS and SELECT. Note that PIN entry screens are an exception and do not follow this design. Selecting NEXT will highlight the items in a defined order. On some screens, the first selectable item is already selected when the screen is presented.

Figure 4:
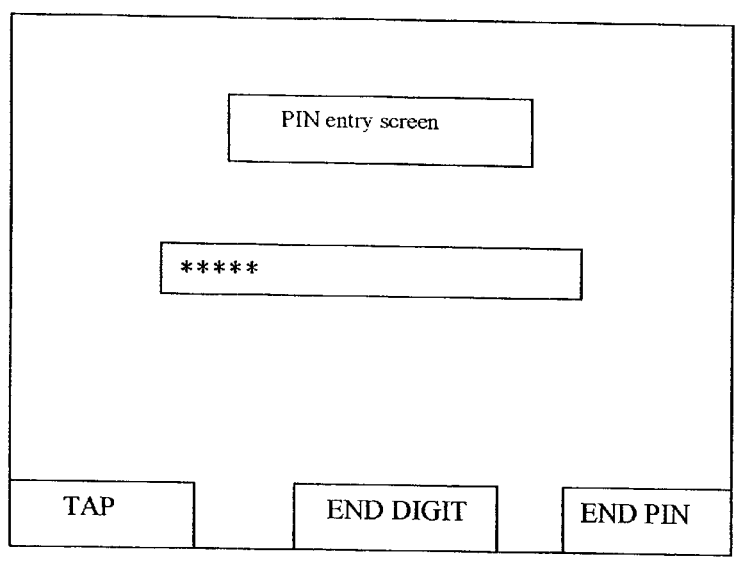
FIG. 4 illustrates the PIN entry screen of the present invention.

With regard to PIN Entry Screens, these screens employ a unique navigation paradigm. The NEXT, PREVIOUS, and SELECT buttons are not displayed in the Navigation Zone on these screens. In their place and occupying the same positions on the screen are the following three buttons: TAP, END DIGIT, and END PIN, respectively. An example of a preferred embodiment of the PIN Entry Screen is presented in FIG. 4.

One preferred method for allowing a visually impaired customer to enter his/her PIN is, as follows:

Please tell me your Personal Identification Number using the three touch zones below.

To enter a digit tap the lower left hand corner of the screen. Tap once, to enter the digit 1, or two times, to enter the digit 2, and so on.

To end the digit, tap the bottom center of the screen. To enter the digit 0, just tap the bottom center of the screen.

To complete entering the PIN, tap the bottom right hand corner of the screen.

Thus, the PIN entry process is as follows:

1. To select a digit, the customer touches the TAP button. The customer touches the button once to select the digit 1, twice to select 2, etc.
2. To enter the selected digit, the customer touches the END DIGIT button. Touching this button alone (without first touching the TAP button) enters the digit 0.
3. The screen displays an asterisk in a box in the center of the screen each time the customer enters a digit. The asterisks are aligned left within the box.
4. To complete entering the PIN, the customer touches the END PIN button.
5. At this point the PIN is authenticated (either by the host or locally, depending on whether this is the initial PIN entry or a PIN re-entry).
6. Depending on whether the PIN has been entered correctly, entered incorrectly with retry allowed, or entered incorrectly without retry, the application will display the Screen Navigation Instructions screen, display an error screen, or will end the session, respectively.

Concerning Menu Screens, these screens contain the following items in the Work Area. Selecting NEXT in the Navigation Zone will highlight the items in the following order:

1. A screen description text box located at the top of the screen.
2. The menu items. Each selectable item is in a separate box that extends the width between the left and right margins. The text within each box is aligned left in a single column. The first letter of each word is capitalized except for some short words and articles (i.e., "is", "the", etc.) The boxes and fonts are of a standard size and style.
3. EXIT, which is located at the bottom of the Work Area.

Touching SELECT will result in end of session processing if the EXIT button has been highlighted or transitioning to the first screen of the selected function.

Account Selection Screens contain the following items in the Work Area. The button positions remain fixed, even if a particular button is not displayed. Selecting NEXT in the Navigation Zone will highlight the items in the following order:

1. A screen description text box located at the top of the screen. This screen description text depends on the function. As an example, for deposit the text reads: "Where shall I put the money?" For the most part, the text is the same as for the sighted versions of the applications.

2. The available accounts displayed vertically down the screen. The information for each individual account is contained within a separate selectable box. The box extends the width between the left and right margins. The boxes and fonts are of a standard size and style. Each box contains the following account information:
   Product Type. Left justified; aligned top left
   Balance. Left justified; aligned bottom left
   Resolver (Account Number) Right justified; aligned top right.
   Resolver Text. Right justified; aligned bottom right 3. Back to Prior Screen. Selecting this button will result in displaying the previous set of accounts when there is more than one set. On the first set of accounts or if there is only one set, this button is not displayed. Under this scenario, if the customer does not wish to select an account, the customer can only select Return to Main Menu or EXIT.

Once an account has been selected and the customer has transitioned to the next screen, Back to Prior Screen redisplays the first set of accounts when there are more than one set.

4. More Accounts. This button is only displayed if the number of accounts in the list exceeds the number that can be displayed on a single screen and this is not the last set. When selected, a new screen with the next set of accounts is displayed.

5. Return to Main Menu. Selecting this button results in redisplaying the Main Menu.

6. EXIT. This button initiates end of session processing. A Print Record Confirmation screen may be displayed when the customer selects this box. This applies to all screens where EXIT is a choice.

Account Selection Screens contain the following items in the Work Area. Selecting NEXT in the Navigation Zone will highlight the items in the following order:

1. A screen description text box located at the top of the screen. This screen description text depends on the function. As an example, for withdrawal the text reads: "I only have $20 bills. How much cash would you like?" For the most part, the text is the same as for the sighted versions of the applications.

2. The amount boxes. These boxes are displayed in a layout similar to the standard Global CAT applications. The Each amount is displayed in a separate box. Selecting NEXT navigates through the boxes in increasing order with "Another Amount" last, when it is displayed. The amounts are selected from top to bottom in two columns that, in turn, are selected from left to right.

3. Back to Prior Screen. This screen results in redisplaying the prior screen.

4. EXIT. Initiates end of session processing.

Amount entry screens contain the following items in the Work Area. Selecting NEXT in the Navigation Zone will highlight the items in the following order:

1. A screen description text box located at the top of the screen.

2. Separate and selectable boxes for each number in the keypad. The keypad will be displayed in the defined layout and form with elongated boxes as compared to the sighted application with the numbers centered in the box. Selecting NEXT will move the highlighted box in increasing order from 1 through 9 then 0 from left to right and then top to bottom.

3. A box containing the amount currently entered by the customer. The text in this box changes as the customer selects numbers from the keypad. When highlighted, the customer can verify the amount is correct. Hidden text reads the accumulated amount: "Your accumulated amount is . . . " The text in this box is right justified with the currency descriptor displayed. The currency descriptor and the associated amount move left as more digits are selected by the customer. The box is located below the keypad.

4. Clear. This box is displayed below the amount entered box and is centered over the left half of the Work Area. When selected, all digits previously entered by the customer are cleared.

5. Enter. This box is displayed to the right of the Clear box and is centered over the right half of the Work Area. Selecting this box enters the amount selected by the customer.

6. Back to Prior Screen. Results in redisplaying the prior screen.

7. EXIT. Initiates end of session processing.

Confirmation screens contain the following items in the Work Area. Selecting NEXT in the Navigation Zone will highlight the items in the following order:

1. The confirmation information. This is application-specific, but should be the same as the sighted version of the application.

2. Yes box. This box is located below the confirmation information and is centered over the left half of the Work Area. The text is left justified within the box.

3. No box. This box is located below the confirmation information and is centered over the right half of the Work Area. The text is left justified within the box.

4. Back to Prior Screen. Selecting this box results in redisplaying the prior screen.

5. EXIT. Initiates end of session processing.

FX Confirmation Screens. On the VIP version of FX screens, the display order for the account and amount information differs from the sighted version of these screens. Below are the specifications for each:

Sighted Version

Amount to be credited to
Line 2 Descriptive text
Line 3
  a. Product Name of the selected destination account
  b. Amount entered/selected by the customer and its currency descriptor
Line 4 Product descriptor (Account Number or "Pet" name) of destination account VIP Version Amount to be credited to
Line 2
  a. Descriptive text
  b. Product Name of the selected destination account
Line 3 Data is left justified and separated by a space.
  a. Product descriptor (Account Number or "Pet" name) of destination account b. Amount entered/selected by the customer and its currency descriptor Summary screens contain the following items in the Work Area. Selecting NEXT in the Navigation Zone will highlight these items in the following order:

1. The summary information. This is application-specific, but should be the same as the sighted version of the application.
2. Return to Main Menu. When selected, the application redisplays the Main Menu.
3. EXIT. Initiates end of session processing.

With regard to Disclosure Screens, for VIP, only one disclosure per screen will be displayed and read to the customer regardless of the length of the disclosure. Disclosures should not exceed more than approximately 400 characters or nine lines in order to be displayed on a single screen. Disclosures should not break across two screens.

Disclosure screens utilize a unique navigation paradigm. Navigation between selectable screen elements proceeds as if all elements (including all the disclosures) are on one screen. As a result, for example, selecting PREVIOUS on first display of the first disclosure when there are multiple disclosures to be displayed will result in displaying the last disclosure in the set with EXIT highlighted.

Disclosure screens can contain the following items in the Work Area. If there is only one disclosure, all of these items are displayed and selecting NEXT in the Navigation Zone will highlight them in the following order. When there is more than one disclosure, not all selectable items are necessarily displayed at one time. The navigation path followed by the customer determines what is actually displayed.

1. Disclosure text; pre-selected when the screen is presented.
2. Shall I go ahead? When there is more than one disclosure to be presented, this box is first displayed once all the disclosures have been displayed to the customer. When the customer selects to go back to a prior disclosure, this box remains displayed on all prior disclosure screens.
3. Yes. When there is more than one disclosure to be presented, this box is first displayed once all the disclosures in the set have been displayed. However, when the customer selects a different disclosure, this box remains displayed on all prior disclosure screens. When selected, the application displays an FX confirmation screen or the summary screen for the current application.
4. No. Same display paradigm as for Yes. When selected, the application displays a negative confirmation screen from which the customer can return to the Main Menu.
5. Back to Prior Screen. Selecting this box results in redisplaying the screen that was displayed immediately before any of the disclosure screens.
6. EXIT. Initiates end of session processing.

The following scenarios are designed to illustrate the navigation paradigm when there is more than one disclosure. In these examples, it is assumed that there are three disclosures. Although as stated above, the navigation paradigm behaves as if there is only one screen containing all of the screen elements, the customer experiences three screens, one for each disclosure, sometimes with a different set of selectable items displayed depending on when and how the customer has navigated to the screen. Scenario 1. In this scenario, when the first disclosure screen is initially displayed, the customer navigates in a forward direction by selecting NEXT. What follows is a recap of which selectable items are displayed on a given screen, as well as the defined order in which they are highlighted. The three disclosure screens as experienced by the customer are denoted by D1, D2, and D3, respectively.

1. D1. Disclosure 1 text is pre-selected. The selectable items displayed at this point on D1 are Disclosure 1, Back to Prior Screen, and EXIT.
2. D2. Disclosure 2 is highlighted. The selectable items displayed on D2 at this point are Disclosure 2, Back to Prior Screen, and EXIT.
3. D3. Disclosure 3 is highlighted. The selectable items displayed on D3 at this point are Disclosure 3, Shall I go ahead?, Yes, No, Back to Prior Screen, and EXIT.
4. D3. Shall I go ahead? is highlighted.
5. D3. Yes is highlighted. If the customer selects Yes, the next logical screen in the application is displayed, an FX confirmation screen or the summary screen.
6. D3. No is highlighted. If the customer selects No, a negative confirmation screen is displayed.
7. D3. Back to Prior Screen is highlighted. Selecting Back to Prior Screen results in redisplaying the screen that was displayed immediately before any of the disclosure screens.
8. D3. EXIT is highlighted. Selecting EXIT initiates end of session processing.

Scenario 2. This scenario begins at step 8 of Scenario 1. In this example the customer navigates backward by selecting PREVIOUS. Where the results of a selected action are the same as in Scenario 1, they have been omitted.

1. D3. Back to Prior Screen is highlighted. The selectable items displayed on D3 at this point are the same as stated in Step 3 of Scenario 1.
2. D3. No is highlighted.
3. D3. Yes is highlighted.
4. D3. Shall I go ahead? is highlighted.
5. D3. Disclosure 3 is highlighted.
6. D2. Disclosure 2 is highlighted. The selectable items displayed on D2 at this point are Disclosure 2, Shall I go ahead?, Yes, No, Back to Prior Screen, and EXIT.
7. D1. Disclosure 1 is highlighted. The selectable items displayed on D1 at this point are Disclosure 1, Shall I go ahead?, Yes, No, Back to Prior Screen, and EXIT.

Scenario 3. In this scenario, when the first disclosure screen is initially displayed, the customer navigates backward by selecting PREVIOUS. Where the results of a selected action are the same as in Scenario 1, they have been omitted.

1. D1. Disclosure 1 text is pre-selected.
2. D3. EXIT is highlighted. The selectable items displayed at this point on D3 are Disclosure 3, Back to Prior Screen, and EXIT. Shall I go ahead?, Yes, and No are not displayed since the customer has not yet viewed all three disclosures.
3. D3. Back to Prior Screen is highlighted.
4. D3. Disclosure 3 is highlighted.
5. D2. Disclosure 2 is highlighted. The selectable items displayed at this point on D2 are Disclosure 2, Shall I go ahead?, Yes, No, Back to Prior Screen, and EXIT. All of the selectable items that, in Scenario 1, were first displayed on D3 are displayed on D2 since all three disclosures have now been displayed.
6. D1. Disclosure 1 is highlighted. The selectable items displayed at this point on D1 are Disclosure 1, Shall I go ahead?, Yes, No, Back to Prior Screen, and EXIT.

The Print Record Confirmation screen contains the following items in the Work Area. Selecting NEXT in the Navigation Zone will highlight these items in the following order:

1. Explanatory text: "Would you like a printed record?"
2. Yes. A record is printed, and the session is ended after confirming to the customer that the record is ready (Goodbye screen is displayed).
3. No. The session is ended after displaying the Goodbye screen.

As in the sighted version of the applications, there are three types of error screens:

1. Screens that allow the customer to retry input or a selection
2. Screens that result in ending the current transaction
3. Screens that result in end of session processing Error screens contain the following items in the Work Area. Selecting NEXT in the Navigation Zone will highlight these items in the following order:
1. Explanatory text. This text provides information about the error condition and will vary depending upon what the error is. Although usually contained within one box, in some cases this text may occupy more than one box. In that case, selecting NEXT in the first box will result in highlighting the second box.
2. Yes. Not displayed on end of session screens.
3. No. Not displayed on end of session screens.

The Navigation Zone contains the standard NEXT, PREVIOUS, and SELECT buttons.

The Work Area and Navigation Zone have preferred embodiments for each screen type.

"Hidden Text" is defined as text that is read to the customer audibly by the screen reader, but is not actually displayed on the screen.

Introductory hidden text. Anytime the customer transitions to a new screen, the screen reader will read a hidden block of text (actually a text string) informing the customer that a new screen is being displayed. This text is currently defined simply as "New Screen".

Descriptive hidden text. For some screens, additional descriptive text is spoken, but not displayed. For Yes and No buttons, the hidden text will vary by the question. In the following examples, hidden text is denoted by being enclosed in brackets ([ ]):

Yes [print a record]
No [do not print a record]
Yes [select another amount]
No [do not select another amount]

In another preferred embodiment there is a screen description text box at the top of each screen, in which the first selectable item usually provides a brief indication about the purpose of the screen such as information, choice/selection, amount entry, or confirmation. For example, "This is the Main Menu Selection screen" or "Where shall I put the money?" This box should preferably be centered and extend the width between the left and right screen margins. The font is left justified within the box and is of a standard style and size.

The present invention offers the customer similar navigation choices within the Work Area as are provided in the sighted version of the applications. The choices offered depend on the type of screen being displayed. For example, "More Accounts" is only offered on account selection screens. The following is the complete set of navigation options offered.

EXIT
Ends the current session.
Return to Main Menu
Re-displays the Main Menu.
Back to Prior Screen
Re-displays the previous screen.
More Accounts
Displays the next set of accounts on Account Selection screens.
Another Amount
Transitions to the Amount Entry screen from Amount Selection screens.
More Balances
Displays the next set of balances on Account Details balance display screens.

Disclosure screens, Confirmation screens, and the Print Record Confirmation screen also display Yes and No choice boxes.

The text for each button is of a standard font and size. Capitalization is as specified in the list, above. The text is left justified within the button.

Figure 2:
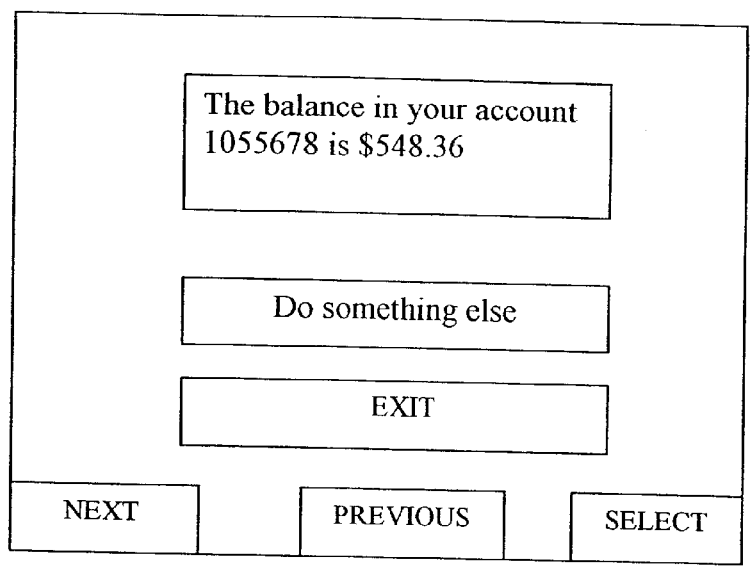
FIG. 2 presents an example of a balance inquiry screen.

FIG. 2 is an example of the placement of navigation choice buttons in the Work Area on an Account Selection screen. Note that the position of the buttons remains unchanged if the "More Accounts" button is not displayed.

A simplified sample transaction selection screen is provided to illustrate the navigation methodology.

1. On entry to any new screen, the customer will hear: "New screen" followed by the text of the first box on the screen.
2. For the screen above, the first choice (CASH) will be color-highlighted and the text "New screen. CASH" will be voiced.
3. If the customer wants cash, the customer would touch SELECT. When the customer touches SELECT, an audible beep-like sound will be generated for feedback. The application will then transition to a new screen to present new choices (for example, dollar amounts). The new screen will have the same three navigation zones at the bottom.
4. If the customer wants a transaction other than cash, the customer would touch NEXT again. The next choice, "DEPOSIT", will be color-highlighted and voiced. The customer would continue to touch NEXT until the customer hears his or her desired choice. When the customer hears the desired choice, the customer would touch SELECT, hear the audible feedback, and the application would transition to the next screen.
5. If the customer continues to touch NEXT past the last choice (EXIT on the above sample screen), the application will wrap around to the first choice on the screen (CASH). If the customer touches any of the navigation zones, the application will automatically terminate any voicing currently in progress.
6. At any time, touching PREVIOUS will highlight and voice the previous choice on the screen. PREVIOUS can be handy when the customer needs to enter numbers on a keypad where there are many keys on the screen. NEXT goes forward and PREVIOUS goes back.
7. Touching anywhere on the screen other than NEXT, PREVIOUS, or SELECT will cause a boop-like tone and no action will be taken. The VIP screens must be navigated using the three keys at the bottom, even for partially sighted customers.

Sometimes there is a mixture of choices and information on the screen. However, the navigation method will be the same. Touching SELECT after information is voiced will cause no action. An example of this type of screen, balance inquiry, is shown below.

1. The customer will hear: "New screen. The balance in your account number 1055678 is $548.36".
2. The information box will be color-highlighted.
3. Touching SELECT will cause a boop-like tone and no action will be taken, because this is not a valid choice.
4. If the customer wants to hear the balance again, the customer would touch NEXT and then PREVIOUS so that the information box is voiced again.
5. Continuing to touch NEXT will, as before, cycle through "Do something else", "EXIT", and the information box.
6. If the customer wants to perform another transaction, the customer would touch NEXT until "Do something else" is voiced and then would touch SELECT.
7. If the customer is finished, the customer would touch NEXT until "EXIT" is voiced and then the customer would touch SELECT.

Figure 3:
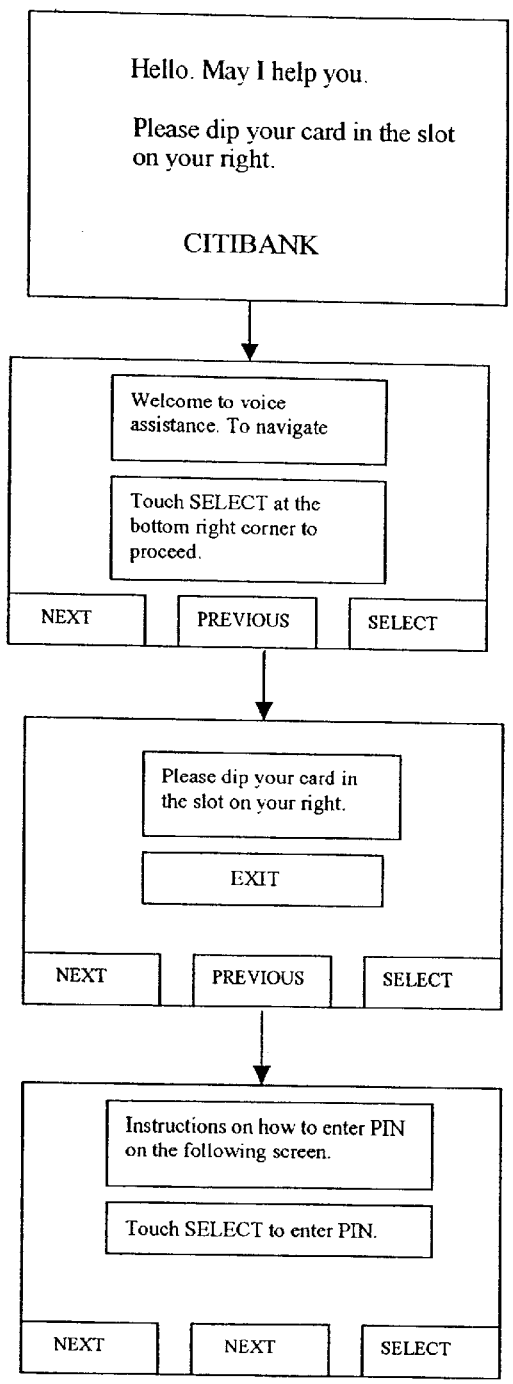
FIG. 3 provides the initial screen flow of the present invention.

FIG. 3 shows an overview of the initial screen flow for VIP customers.

The first screen, known as a Welcome Screen, is displayed when the VIP customer inserts the headset plug into the jack and then touches the screen twice in the top right-hand corner. Audible beeps will be heard when the customer touches the top right-hand corner.

The second screen is then displayed and the VIP customer hears "Welcome to voice assistance. Touch the bottom left corner of the screen to hear instructions." Touching NEXT will cause the instruction box to be voiced ("Welcome to voice assistance. To navigate . . . ") To start a transaction, the customer touches SELECT when the Touch SELECT . . . " box is voiced.

The next screen prompts the VIP customer to dip his/her card. The customer always hears "Touch bottom left corner to proceed" when entering a screen. Touching NEXT will voice the "Please dip" box. Dipping the card will cause a transition to the next screen.

The fourth screen displays a PIN entry instruction screen. PIN entry is a special method. The customer can hear instructions repeatedly on this screen using NEXT until he/she is ready top proceed to PIN entry.

Various preferred embodiments of the invention have been described in fulfillment of the various objects of the invention. It should be recognized that these embodiments are merely illustrative of the principles of the invention. Numerous modifications and adaptations thereof will be readily apparent to those skilled in the art without departing from the spirit and scope of the present invention.

What is claimed is:

1. An automated teller machine, comprising:

a touch screen display for displaying operation instructions to a customer and for receiving input from a customer;

an output jack for providing signals which can be converted to audible sounds by means of a headset;

a bill dispensing mechanism for dispensing a bank not corresponding to a specified amount;

a receipt issuing unit for printing a transaction content and for issuing a receipt on which the transaction content is printed; and a controller connected to the card reader, the touch screen display, the output jack, the bill dispensing unit, and the receipt issuing unit, the controller providing signals to the output jack corresponding to information provided on the touch screen display;

wherein the customer inputs the customer's personal identification number by:

tapping out the first digit of the personal identification number, touching an end digit key to indicate the digit is complete;

repeating this procedure for each subsequent digit of the personal identification number; and touching an end pin key when the personal identification number is complete.

2. The automated teller machine according to claim 1 further comprising a card reader for reading card information from a card.

3. The automated teller machine according to claim 1, wherein there is a physical guide bar with Braille encoding below the touch screen display.

4. The automated teller machine according to claim 1, wherein the touch screen display comprises a context zone, a work zone, and a navigation zone.

5. The automated teller machine according to claim 4, wherein an audible sound is sent to the output jack when the touch screen display is touched outside the navigation zone.

6. A method for assisting a visually impaired individual in performing a financial transaction at an automated teller machine, comprising:

initiating a visually impaired transaction session through a preset event at the automated teller machine;

wherein the automated teller machine comprises a touch screen display for displaying operation instructions to a customer and for receiving input from a customer; an output jack for providing signals which can be converted to audible sounds by means of a headset; a bill dispensing mechanism for dispensing a bank not corresponding to a specified amount; a receipt issuing unit for printing a transaction content and for issuing a receipt on which the transaction content is printed; and a controller connected to the card reader, the touch screen display, the output jack, the bill dispensing unit, and the receipt issuing unit, the controller providing signals to the output jack corresponding to information provided on the touch screen display;

providing instructions to the visually impaired individual for performing the financial transaction through an output jack which provides signals which can be converted to audible sounds by means of a headset;

receiving input from the visually impaired individual through the touch screen display;

wherein the customer inputs the customer's personal identification number by:

tapping out the first digit of the personal identification number, touching an end digit key to indicate the digit is complete;

repeating this procedure for each subsequent digit of the personal identification number; and touching an end pin key when the personal identification number is complete.

7. The method for assisting a visually impaired individual in performing a financial transaction at an automated teller machine according to claim 6, wherein the automated teller machine further comprises a card reader for reading card information from a card.

8. The method for assisting a visually impaired individual in performing a financial transaction at an automated teller machine according to claim 6, wherein there is a physical guide bar with Braille encoding below the touch screen display.

9. The method for assisting a visually impaired individual in performing a financial transaction at an automated teller machine according to claim 6, wherein the touch screen display comprises a context zone, a work zone, and a navigation zone.

10. The method for assisting a visually impaired individual in performing a financial transaction at an automated teller machine according to claim 9, wherein an audible sound is sent to the output jack when the touch screen display is touched outside the navigation zone.

* * * * *